March 25, 1924.

E. A. LAUGHLIN

CAR MOUNTING

Filed July 16, 1921

1,488,451

3 Sheets-Sheet 1

Witnesses:
W. Schnellhardt.
B. J. Richards

Inventor
Elmyr A. Laughlin
By Joshua R. H. Potts
His Attorney

March 25, 1924.

E. A. LAUGHLIN

CAR MOUNTING

Filed July 16, 1921

1,488,451

3 Sheets-Sheet 2

Witnesses:
Wm. Schnellhardt
B. G. Richards

Inventor
Elmyr A. Laughlin
By Joshua R. H. Potts
His Attorney

March 25, 1924.

E. A. LAUGHLIN

CAR MOUNTING

Filed July 16, 1921

1,488,451

3 Sheets-Sheet 3

Witnesses:

Inventor
Elmyr A. Laughlin

Patented Mar. 25, 1924.

1,488,451

UNITED STATES PATENT OFFICE.

ELMYR A. LAUGHLIN, OF OREGON, ILLINOIS.

CAR MOUNTING.

Application filed July 16, 1921. Serial No. 485,161.

*To all whom it may concern:*

Be it known that I, ELMYR A. LAUGHLIN, a citizen of the United States, and a resident of the city of Oregon, county of Ogle, and State of Illinois, have invented certain new and useful Improvements in Car Mountings, of which the following is a specification.

My invention relates to improvements in car mountings and has for its object the provision of an improved construction of this character whereby cars, such as freight cars, may be suitably mounted on their trucks and at the same time a very simple and light form of truck employed.

Other objects will appear hereinafter.

The invention consists in the combinations and arrangements of parts hereinafter described and claimed.

Figure 1:
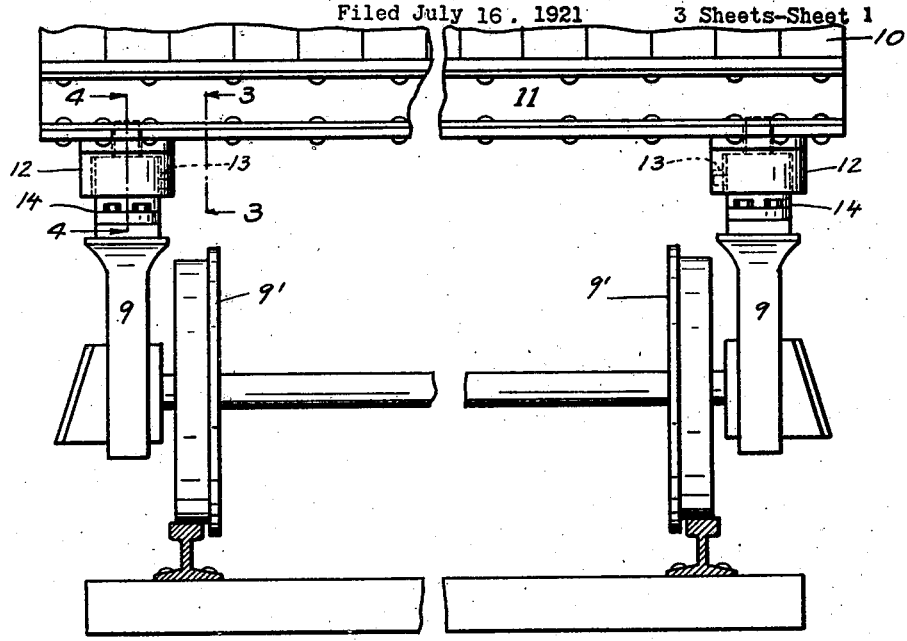
Figure 2:
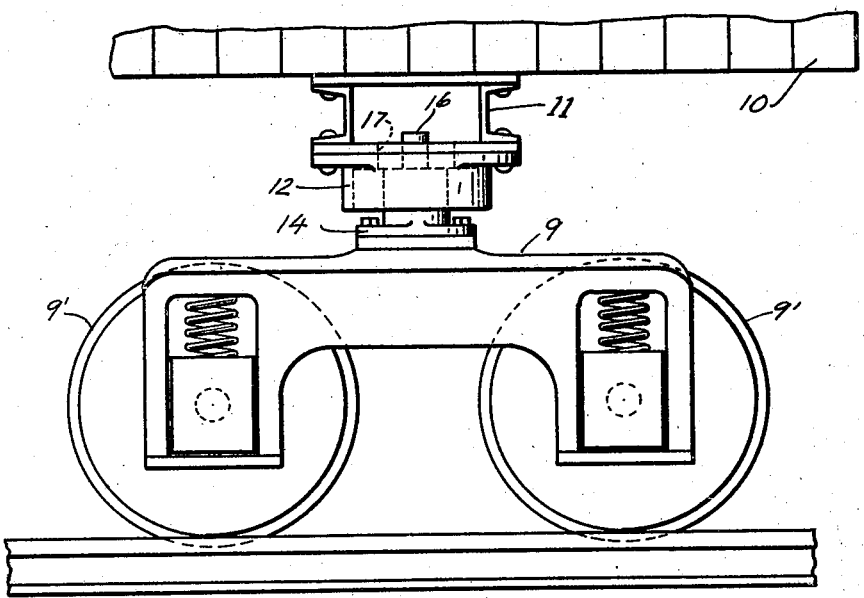
Figure 3:
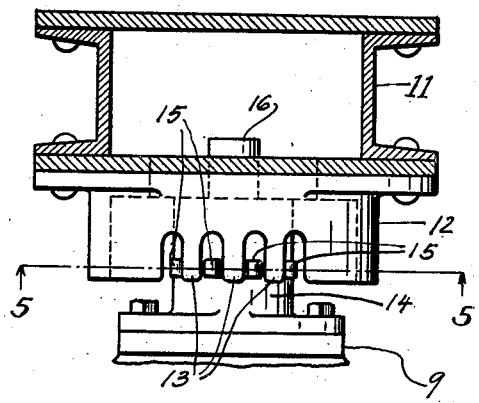
Figure 4:
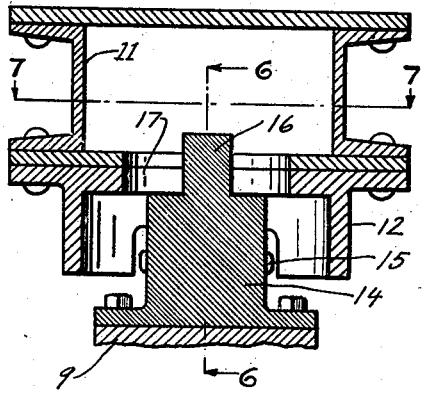
Figure 5:
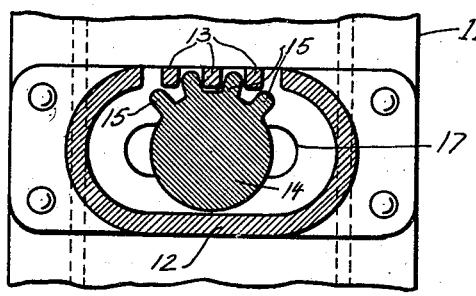
Figure 6:
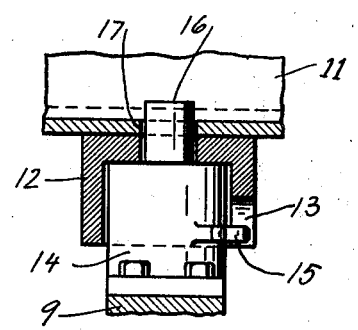
Figure 7:
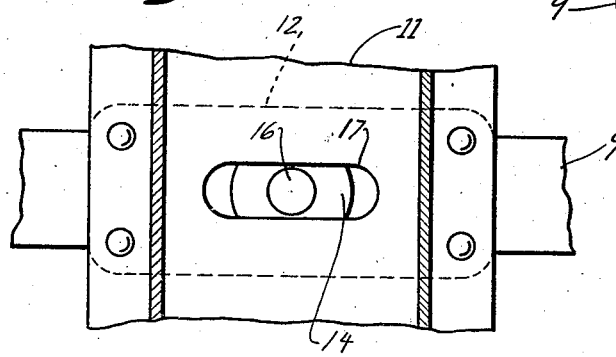
Figure 8:
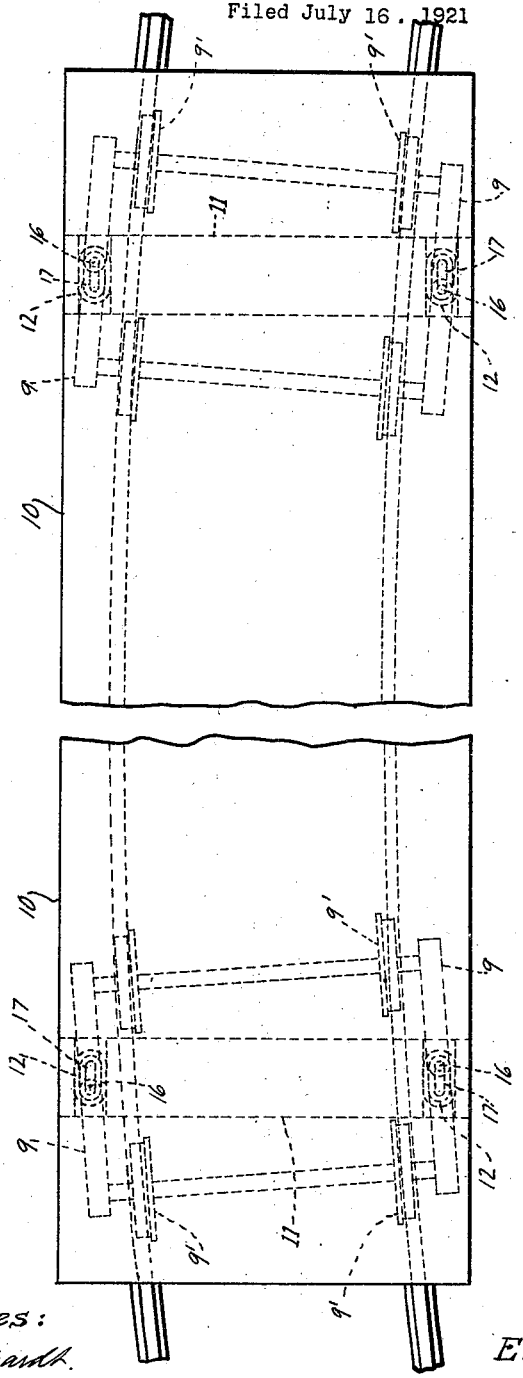

The invention will be best understood by reference to the accompanying drawings forming a part of this specification, and in which, Fig. 1 is a partial end view of a car mounting embodying the invention, Fig. 2 is a side view thereof, Fig. 3 is an enlarged section taken on line 3—3 of Fig. 1, Fig. 4 is an enlarged section taken on line 4—4 of Fig. 1, Fig. 5 is a horizontal section taken on line 5—5 of Fig. 3, Fig. 6 is a vertical section taken on line 6—6 of Fig. 4, Fig. 7 is a horizontal section taken on line 7—7 of Fig. 4, and Fig. 8 is a top plan diagrammatic view illustrating in exaggeration, the action of the car mounting when the car passes around a curve.

The preferred form of construction as illustrated in the drawings, comprises a suitable truck construction 9 having suitable wheels 9' to run upon the rails of a railroad. The usual car body 10 is mounted upon two of such trucks, said car body being provided at each end with the usual transverse body bolster 11 as indicated. Arranged at each end of the body bolster 11 is a bearing housing 12 rigidly secured thereto and depending therefrom. Each of the bearing housings 12 is in inverted cup form and is longitudinally elongated or oblong in form. Each housing 12 is provided at its inner side with gear teeth 13 as indicated. Each of the housings 12 fits loosely over a corresponding substantially cylindrical bearing post 14 mounted on the corresponding side frame of the corresponding truck, and is thus capable of both pivotal and longitudinal movement in the housing. As will be noted the side frames of the truck are not rigidly connected to each other, there being sufficient flexibility to permit of these movements. Each of the bearing posts 14 is provided on its inner side with gear teeth 15 intermeshing with the gear teeth 13 formed in the inner side of the corresponding housing 12, the gear teeth 13 thus constituting, in effect, a rack bar compelling a longitudinal movement of the corresponding bearing post upon the relative pivotal movement thereof in the housing. Each bearing post 14 carries an upwardly extending trunnion or pivot pin 16 loosely engaging a corresponding longitudinal slot 17 in the top of the corresponding housing 12 and the bottom of the corresponding bolster 11, said trunnion also permitting of longitudinal and pivotal movement and tending to insure against accidental displacement of the parts.

By this arrangement it will be observed that the weight of the car will be applied to the truck closely adjacent to the wheels thereof, thus permitting of a comparatively light truck construction. When the car passes around a curve in the railroad track, it is necessary that the trucks pivot or turn relatively to the car to permit of the free movement of the car around the curve, such pivotal or turning movement being compelled by the engagement of the wheel flanges with the sides of the rail members in the usual way. This turning of the truck relatively to the car body causes each of the bearing posts 14 to turn or pivot in its corresponding housing 12, and this turning or pivotal movement of the bearing posts causes the teeth 15 thereon to co-operate with the corresponding teeth 13 to compel longitudinal movement of the bearing post in the housing. The arrangement is such that as the forward truck of the car passes onto the curve, the outer side of the truck relatively to the curve, will be shifted forwardly and the inner side of the truck shifted rearwardly, thus properly positioning the truck relatively to the car and rails as indicated diagrammatically in Fig. 8. Likewise, when the rear truck passes onto the curve, the outer side thereof will be shifted rearwardly and the inner side thereof shifted forwardly to effect such proper positioning of the parts. Thus while there is no central pivotal connection between the body bolsters and the truck, the inter action of the parts cause substantially the same movements as if there was such a pivotal connection. In this way, the trucks will assume positions under the car substantially the same as that assumed when each truck is secured to the car by means of a single central pivot. Owing to the fact that by means of the present arrangement, the weight of the car is applied to the truck outside of and closely adjacent to the wheels, the cross connections of the truck need only be strong enough to maintain the relative positions thereof as they bear none of the weight of the car. By this arrangement, therefore, a truck of comparatively light, and therefore economical construction, may be employed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination with a car body and a truck therefor, of bearings on said truck arranged at opposite sides thereof and permitting of both longitudinal and pivotal movements between the sides of said body and the sides of said truck, substantially as described.

2. The combination with a car body and a truck therefor, of bearings for said body on said truck arranged at opposite sides thereof and permitting of both longitudinal and pivotal movements; and means compelling relative longitudinal movement between the parts of said bearings upon relative pivotal movement thereof, substantially as described.

3. The combination with a car body and a truck therefor, of bearings for said body on said truck arranged at opposite sides thereof and permitting of both longitudinal and pivotal movements; and gear teeth connections between the parts of each bearing compelling relative longitudinal movement between the parts of said bearings upon relative pivotal movement thereof, substantially as described.

4. The combination with a car body and a truck therefor, of bearings for said body on said truck arranged at opposite sides thereof and permitting of both longitudinal and pivotal movements; and means compelling relative longitudinal movement in opposite directions between the parts of said bearings upon relative pivotal movement thereof, substantially as described.

5. The combination with a car body and a truck therefor, of bearings for said body on said truck arranged at opposite sides thereof and permitting of both longitudinal and pivotal movements; and gear teeth connections between the parts of each bearing compelling relative longitudinal movement in opposite directions between said parts upon relative pivotal movement thereof, substantially as described.

6. The combination with a car body and a truck therefor, of a bearing housing arranged at each side of said body above the carresponding side of said truck, each of said housings being in longitudinally elongated cup form; substantially cylindrical bearing posts on the sides of said truck fitting said housings; and intermeshing teeth on said bearing posts and corresponding housings, substantially as described.

7. The combination with a car body and a truck therefor, of a bearing housing arranged at each side of said body above the corresponding side of said truck, each of said housings being in longitudinally elongated cup form; substantially cylindrical bearing posts on the sides of said truck fitting said housings; and intermeshing teeth on the inner sides of said bearing posts and corresponding housings, substantially as described.

8. A car truck bearing comprising bearing members arranged for both longitudinal and pivotal movement relatively to each other, and means compelling relative longitudinal movement between the parts of said bearing upon relative pivotal movement thereof, substantially as described.

9. A car truck bearing comprising bearing members arranged for both longitudinal and pivotal movement relatively to each other, and intermeshing gear teeth on said bearing members compelling relative longitudinal movement between them upon relative pivotal movement thereof, substantially as described.

10. A car truck bearing comprising a bearing housing in inverted oblong cup form; a substantially cylindrical bearing member fitting within said housing and capable of both pivotal and longitudinal movement therein; and intermeshing gear teeth on the sides of said housing and bearing member, substantially as described.

In testimony whereof I have signed my name to this specification in the presence of two subscribing witnesses.

ELMYR A. LAUGHLIN.

Witnesses:
CLARENCE E. THREEDER,
FREDA C. APPLETON.